Aug. 9, 1927.
J. J. GROETKEN
1,638,333
FLUID TESTING DEVICE
Filed March 27, 1925
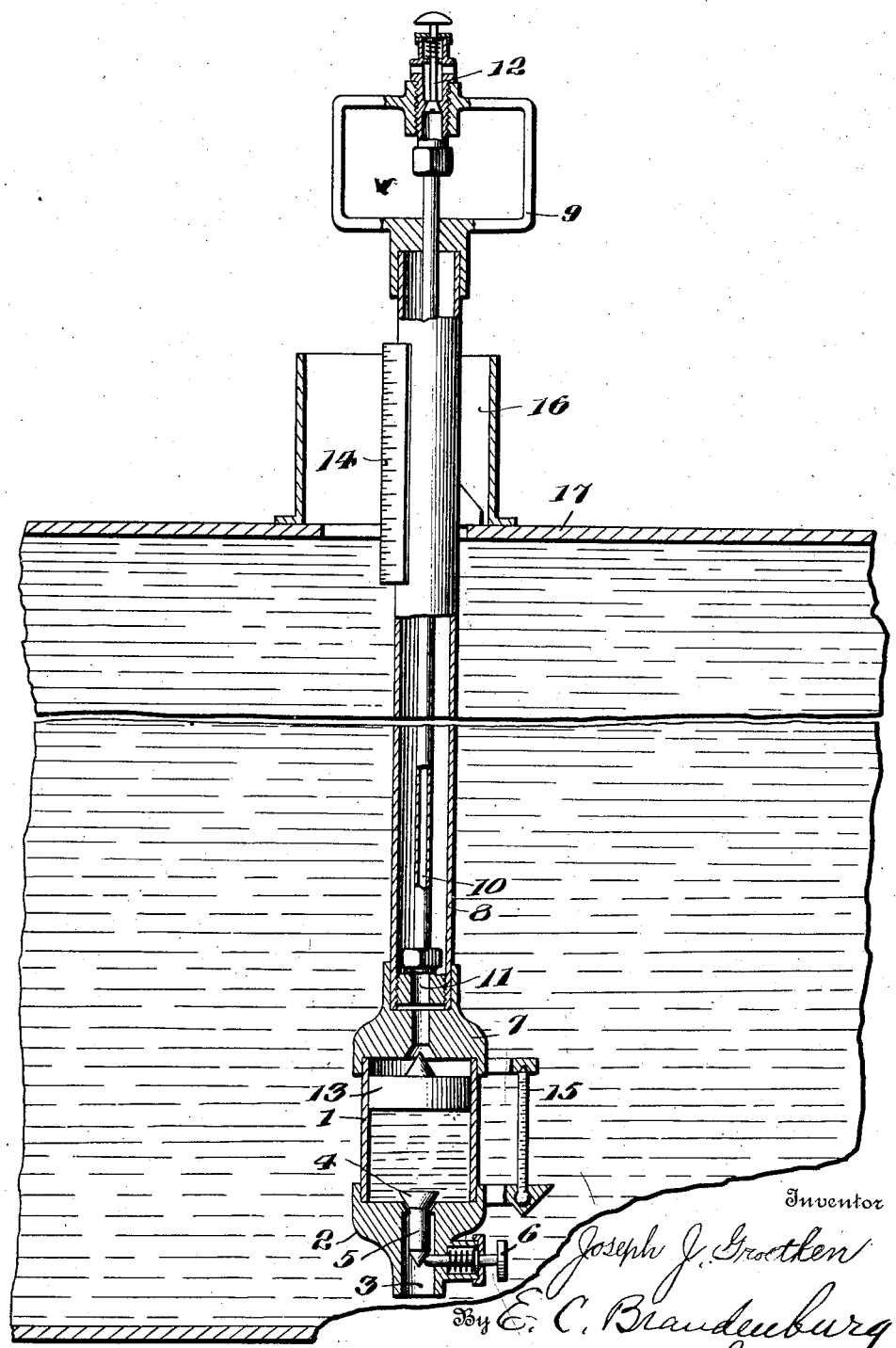
Inventor
Joseph J. Groetken
By E. C. Brandenburg
his Attorney Patented Aug. 9, 1927.

1,638,333

UNITED STATES PATENT OFFICE.

JOSEPH J. GROETKEN, OF AURORA, ILLINOIS.

FLUID-TESTING DEVICE.

Application filed March 27, 1925. Serial No. 18,837.

This invention relates to a fluid testing device for reservoir tanks and the like, and the object of my invention is to construct a testing device which may be lowered in to the reservoir or tank to any desired depth wherefrom a sample of the contents thereof may be collected and then removed for testing.

The accompanying drawing is a vertical sectional view of my invention as applied to a tank.

The numeral 1 indicates preferably a cylindrical receptacle provided at its lower end with a nipple 2, having an opening 3. This opening is normally closed by a valve 4, having a depending valve stem, 5. Arranged horizontally in the nipple 2 is an adjustable spring pressed plunger 6, which when pressed inwardly is adapted to raise the valve 4. The upper end of the cylindrical receptacle 1 is secured to the union 7 and extending upwardly therefrom is a cylindrical tube 8, the upper end of which is provided with a handle 9. Arranged within the tube 8 is a duct 10, the lower end of which communicates with an opening 11 in the union 7, said opening communicating with the cylindrical receptacle 1. The upper end of the duct 10 is provided with a valve 12 and arranged in the cylindrical receptacle 1 is a float valve 13, which when in its upper position is adapted to close the opening 11.

Arranged along the side of the tube 8 is a graduated scale 14 which reads two ways from a given point, the scale adapted to give the number of inches of gasoline out of the shell or the number of inches in the dome. Arranged to the side of the receptacle 1 is a suitable thermometer 15 which enables the operator to ascertain the temperature at the location of the post.

As disclosed in Fig. 1, the sampling device is lowered through a port hole 16, in the reservoir or tank 17, to the desired depth. The valve 12 being closed, no fluid has entered the receptacle 1, however, at the desired depth the valve 12 is opened, permitting the fluid to enter the receptacle 1, which when filled causes the float 13 to rise and close the receptacle. The testing device is then removed, after which the plunger 6 is actuated, raising the valve 4 and emptying the contents for testing, as desired.

From the foregoing, it will be seen that I have devised a sampling device of such a character as to be sturdy in construction and simple in operation and one which is thoroughly reliable, and it is obvious that more or less slight changes might be made without departing from the scope of my invention, therefore, I do not wish to be limited to the exact construction shown.

I claim:

1. A fluid testing device including a receptacle having openings in substantially the opposite ends thereof, a normally closed valve in position to close one of said openings, a tube of constricted diameter extending upwardly from the other opening, and an enlarged tube extending upwardly from substantially the top of said receptacle about the first-mentioned tube.

2. A fluid testing device including a receptacle having openings in the upper and lower ends thereof, a normally closed valve in position to close the lower opening, an air tube of constricted diameter extending upwardly from the upper opening, a normally closed valve in the outer end of said air tube, an enlarged tube extending upwardly from the top of said receptacle about said air tube, and a handle connected with said enlarged tube.

3. A fluid testing device including a substantially cylindrical casing, caps fitted over the opposite ends of said casing and having openings therethrough, a normally closed valve positioned in the opening in one of said caps, an enlarged tube connected with the other cap and extending outwardly therefrom, a handle connected with said enlarged tube, an air tube of constricted diameter extending upwardly through said enlarged tube from the opening in the last-mentioned cap, and a normally closed valve in the outer end of said air tube adjacent the handle.

4. A fluid testing device including a substantially cylindrical casing, caps fitted over the ends of said casing and having openings therethrough, a normally closed valve positioned in one of said openings and having a valve stem extending outwardly therefrom, a manually operated spring-pressed stem extending and movable laterally in position to engage said valve stem to unseat the valve, a tube extending upwardly from the opposite opening, a float mounted in said casing in position to operate a valve to close said last-mentioned opening, and a normally closed valve adjacent the outer end of the tube.

In testimony whereof I affix my signature.

JOSEPH J. GROETKEN.